United States Patent
Kempf et al.

(10) Patent No.: US 10,650,791 B2
(45) Date of Patent: May 12, 2020

(54) DISPLAY SYSTEM

(71) Applicant: TEXAS INSTRUMENTS INCORPORATED, Dallas, TX (US)

(72) Inventors: Jeff Kempf, Dallas, TX (US); Dan Morgan, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/232,179

(22) Filed: Dec. 26, 2018

(65) Prior Publication Data

US 2019/0206369 A1 Jul. 4, 2019

Related U.S. Application Data

(60) Provisional application No. 62/611,239, filed on Dec. 28, 2017.

(51) Int. Cl.
| | |
|---|---|
| *G09G 5/391* | (2006.01) |
| *G06F 3/01* | (2006.01) |
| *G09G 5/36* | (2006.01) |
| *G09G 3/20* | (2006.01) |

(52) U.S. Cl.
CPC ............ *G09G 5/391* (2013.01); *G06F 3/013* (2013.01); *G09G 5/363* (2013.01); *G09G 3/2051* (2013.01); *G09G 2320/0242* (2013.01); *G09G 2340/0407* (2013.01); *G09G 2340/0435* (2013.01);
(Continued)

(58) Field of Classification Search
None
See application file for complete search history.

(56) References Cited

U.S. PATENT DOCUMENTS

| | | | |
|---|---|---|---|
| 6,252,989 B1 | 6/2001 | Geisler et al. | |
| 6,990,246 B1 * | 1/2006 | Ferguson | H04N 19/172 375/E7.037 |

(Continued)

FOREIGN PATENT DOCUMENTS

WO 2017214671 A1 12/2017

OTHER PUBLICATIONS

Jones, A., McDowall, I., Yamada, H., Bolas, M., Debevec, P., Rendering for an Interactive 360° Light Field Display, Jul. 2007, ACM Transactions on Graphics, vol. 26, No. 3, pp. 1-10. (Year: 2007).*

(Continued)

*Primary Examiner* — Said Broome
(74) *Attorney, Agent, or Firm* — Michael A. Davis, Jr.; Charles A. Brill; Frank D. Cimino

(57) ABSTRACT

Systems and method for image generation in a gaze tracking display. A gaze tracking display system includes a graphics processor and display circuitry. The graphics processor is configured to perform foveated rendering of image data, and to output foveated image data. The display circuitry is coupled to the graphics processor. The display circuitry includes a display device and a display controller. The display device is configured to produce a viewable image. The display controller is configured to drive the display device. The display controller includes foveated data reconstruction circuitry configured to produce an image at a resolution of the display device based on the foveated image data received from the graphics processor.

15 Claims, 5 Drawing Sheets

(52) U.S. Cl.
CPC ..... *G09G 2350/00* (2013.01); *G09G 2354/00* (2013.01); *G09G 2360/18* (2013.01)

(56) References Cited

U.S. PATENT DOCUMENTS

| | | | | |
|---|---|---|---|---|
| 2004/0227703 | A1* | 11/2004 | Lamvik | G02B 27/0172 |
| | | | | 345/76 |
| 2005/0018911 | A1 | 1/2005 | Deever | |
| 2014/0347267 | A1* | 11/2014 | Nishi | G06F 3/147 |
| | | | | 345/156 |
| 2017/0228855 | A1* | 8/2017 | Bates | G06T 5/006 |
| 2017/0287446 | A1 | 10/2017 | Young et al. | |

OTHER PUBLICATIONS

International Search Report for PCT/US2018/068028 dated May 7, 2019.

* cited by examiner

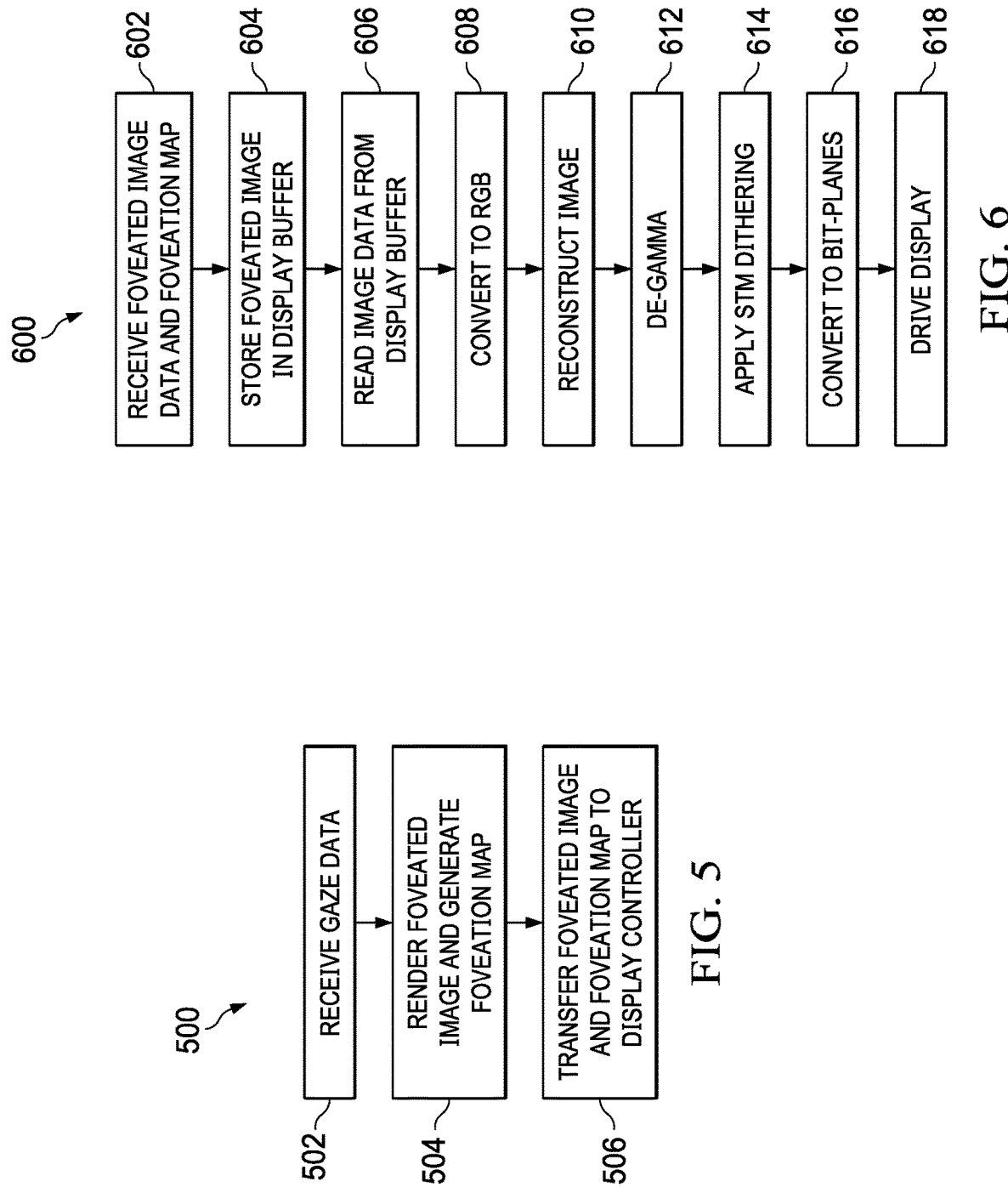

DISPLAY SYSTEM

CROSS-REFERENCE TO RELATED APPLICATION(S)

This application claims priority to U.S. Provisional Application No. 62/611,239, filed Dec. 28, 2017, titled "Display System," which is hereby incorporated herein by reference in its entirety.

BACKGROUND

A variety of display technologies may be tailored for use by a single viewer. For example, near eye headsets are used in virtual reality and augmented reality systems to provide a video display directed to a single user. In near eye headsets, achieving high display frame rates for supporting light field three-dimensional (3D) optics or multi-focal plane 3D optics (or other non-stereoscopic 3D optics) is desired. Displaying images realistically in the optical realm may involve using light fields or multi focal planes rather than the traditional stereoscopic method. Whereas displaying 3D with the stereoscopic method requires that each eye is updated at 60 Hertz (Hz) (both eyes collectively at 120 Hz), using light fields or multi focal planes requires much higher frames rates. For example, if in a multi focal plane system the image displayed at each focal plane is to be updated at 60 Hz (fast enough to prevent flicker on each plane), and six optical focal planes are supported, then a 60 Hz×6=360 Hz end-to-end frame rate is needed. This means that the device sourcing the image, typically a graphics processor, must generate images at 360 Hz and then transfer these images at 360 Hz to the display chip set while simultaneously minimizing the power and cost of the electronics. This is challenging because higher bandwidth, in this case due to the higher frame rates, typically drives up the power and cost of the circuitry.

SUMMARY

Systems and method for image generation in a gaze tracking display are disclosed herein. In one example, a gaze tracking display system includes a graphics processor and display circuitry. The graphics processor is configured to perform foveated rendering of image data, and to output foveated image data. The display circuitry is coupled to the graphics processor. The display circuitry includes a display device and a display controller. The display device is configured to produce a viewable image. The display controller is configured to drive the display device. The display controller includes foveated data reconstruction circuitry configured to produce an image at a resolution of the display device based on the foveated image data received from the graphics processor.

In another example, a method for generating an image display includes performing, by a graphics processor, foveated rendering of image data to produce foveated image data. The foveated image data is transferred from the graphics processor to a display controller that drives a display device. An output image is generated by the display controller at a resolution of the display device from the foveated image data received from the graphics processor. The display device displays the output image.

In a further example, a display system includes a display device and a display controller. The display device is configured to produce a viewable image. The display controller is configured to drive the display device. The display controller includes a frame buffer and foveated data reconstruction circuitry. The frame buffer is configured to store the foveated image data received from a graphics processor. The foveated data reconstruction circuitry is coupled to an output of the frame buffer. The foveated data reconstruction circuitry is configured to produce an image at a resolution of the display device based on the foveated image data stored in the frame buffer.

BRIEF DESCRIPTION OF THE DRAWINGS

For a detailed description of various examples, reference will now be made to the accompanying drawings in which:

FIGS. 3A-3C show spatial reconstruction of foveated image data in a display controller in accordance with various examples;

FIG. 5 shows a flow diagram for a method for producing image data in a graphics processor in accordance with various examples; and FIG. 6 shows a flow diagram for a method for processing image data in a display controller in accordance with various examples.

DETAILED DESCRIPTION

Figure 1:
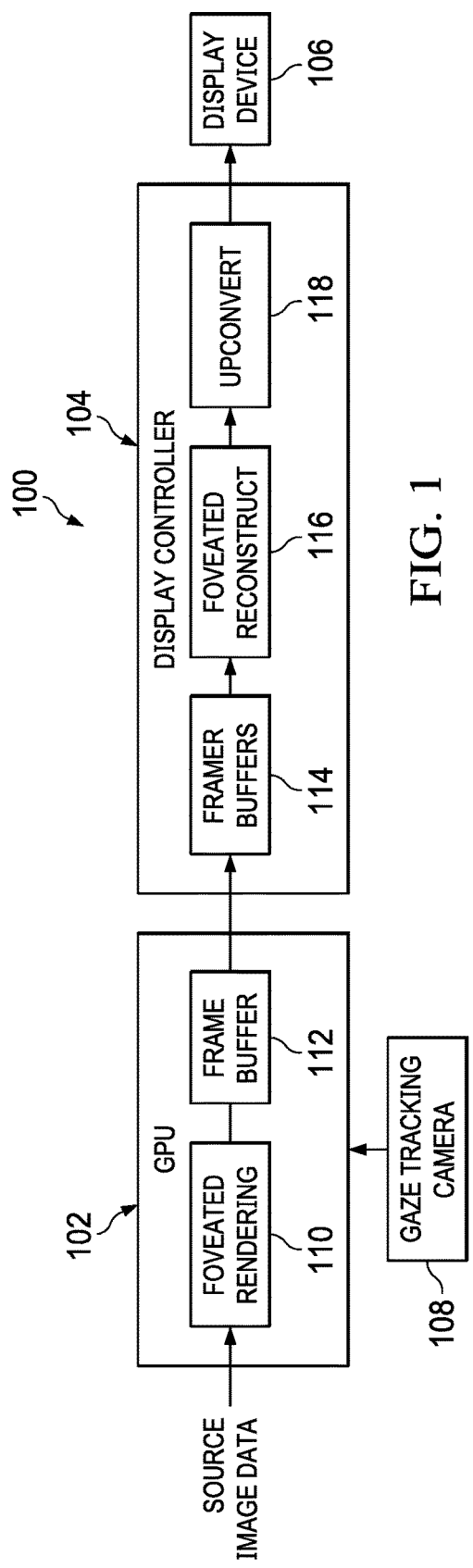
FIG. 1 shows a block diagram of an image generation system in accordance with various examples.

Certain terms are used throughout the following description and claims to refer to particular system components. As one skilled in the art will appreciate, different parties may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

While providing high display frame rates for supporting light field three-dimensional (3D) optics or multi-focal plane 3D optics is desirable, the circuitry required to provide the bandwidth that enables high frame rates typically increases the cost and power consumption of the integrated circuits involved. Bandwidth drives power, and display panel and controller power increases as the pixel count and frame rate increase. Maximizing battery runtime and minimizing headset heating are key concerns in Near Eye headsets.

Implementations of the display system and method of the present disclosure reduce the power consumed by the image data interface between the display controller and the graphics processor. Some implementations also reduce the cost of the display controller and the power consumed by the display controller by reducing bandwidth needed through a substantial portion of the display controller's circuits and by reducing the size of the frame memory provided in the display controller. Examples disclosed herein also reduce the power and complexity of the graphics processor by allowing the graphics processor to send foveated image data directly to the display controller, and thereby eliminating the need for image reconstruction processing in the graphics processor.

Some implementations allow for a reduction in graphics processor to display controller communication bandwidth by transferring foveated image data from the graphics processor to the display controller. The graphics processor executes foveated rendering of image data, and rather than reconstructing the image, the graphics processor transfers the foveated image data to the display controller. The display controller can reconstruct the image from the foveated image data by filling in missing pixels.

By reducing the bandwidth needed to transfer an image, some implementations reduce the time required to transfer an image, thereby reducing image latency and providing for an increased frame rate that facilitates generation of realistic three-dimensional images. Some implementations may also further increase the frame rate to the display to provide suppression of color separation artifacts.

FIG. 1 shows a block diagram of a gaze tracking display system 100 in accordance with various examples. The gaze tracking display system 100 includes a graphics processor (GPU) 102, a display controller 104, a display device 106, and a gaze tracking camera 108. The display controller 104 and the display device 106 may be referred to herein as display circuitry or a display system. The display device 106 presents image data received from the display controller 104 in visual form. The display device 106 may include a digital micro-mirror device (DMD), a liquid crystal display (LCD) device, a liquid crystal on silicon (LCOS) device, or other type of display technology. In some implementations of the gaze tracking display system 100, the display device 108 may implement a near-eye display as employed in a virtual reality or augmented reality headset. Some implementations of the display device 106 include up-sampling circuitry and/or rendering.

The gaze tracking camera 108 captures images of a user viewing the display device 106 and transfers the captured images to the GPU 102. The GPU 102 processes the images received from the gaze tracking camera 108 to determine the area of the visual image produced by the display device 106 to which the user's eyes are directed. The GPU 102 is an instruction execution device (a processor) that includes circuitry for efficiently rendering images in memory. For example, the GPU 102 may include circuitry to accelerate the rending of polygons in memory. The GPU 102 performs operations specified by instructions retrieved from a computer-readable medium, such as a volatile or non-volatile memory device. The instructions executed by the GPU 102 may be tailored for efficient manipulation of image data. The GPU 102 may include multiple execution units (hundreds or thousands of execution units) that allow the GPU 102 to perform many operations in parallel.

The GPU 102 includes foveated rendering circuitry 110 that renders the source image data 114 in accordance with the area of the visual image produced by the display device 106 to which the user's eyes are directed. That is, the foveated rendering circuitry 110 performs foveated rendering of image data. Foveated rendering produces an image with resolution that decreases with distance from the focal point of the user's gaze.

Figure 2:
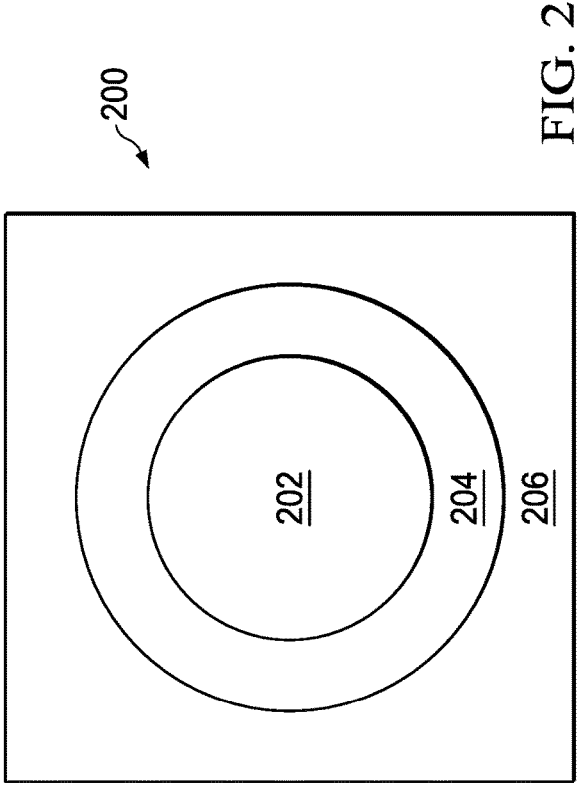
FIG. 2 shows a diagram of a foveated image in accordance with various examples.

FIG. 2 shows an example of an image 200 produce using foveated rendering in accordance with various examples. In producing the image 200, the GPU 102 processes the images received from the gaze tracking camera 108 and determines that a user's eyes are focused on area 202. The GPU 102 renders a portion of the image 200 within area 202 at high resolution, renders a portion of the image 200 in area 204 at a lesser resolution relative to area 202, and renders a portion of the image 200 in area 206 at a lesser resolution relative to area 204. In some implementations of the GPU 102, the area 202 may correspond to an area defined by an angle of about 12° about a central point of the user's focus. Accordingly, the area 202 rendered at a high resolution may be relatively small and the amount of image data produced by the foveated rendering may be greatly reduced relative to an image that is rendered at high resolution in its entirety. For example, image data produced by foveated rendering may be ¼ to ¹⁄₁₀₀ or less of the image data produced by rendering the entire image at high resolution.

The GPU 102 may also include a frame buffer 112 that stores foveated image data generated by the foveated rendering circuitry 102 for transmission to the display controller 104. Thus, the GPU 102 does not reconstruct the image from the foveated image data, but sends the foveated image data to the display controller 104 for reconstruction. In some implementations, the GPU 102 may lack or bypass the frame buffer 112 and send the foveated image data to the display controller 104 in bursts. Because the quantity of data produced by the foveated rendering is substantially reduced relative to a high-resolution image rendering, the bandwidth of the interface connecting the GPU 102 to the display controller 104 may be reduced, with an attendant reduction in data transfer power consumption. Because the GPU 102 does not reconstruct the image from the foveated image data, the GPU 102 is less complex and consumes less power than a GPU providing conventional foveated image processing.

A display controller is a circuit that generates the signals (display synchronization signals) for driving a display device. For example, a first display controller generates the signals for driving an LCD and a second display controller generates the signals for driving a DMD. The first display controller is incompatible with the DMD and the second display controller is incompatible with the LCD. The display controller reads imaged data from a memory (a frame buffer) and generates the signals to drive the display device based on the image data. The display controller 104 receives the foveated image data transmitted by the GPU 102 and reconstructs an image for presentation on the display device 106. The display controller 104 includes frame buffers 114, foveated image data reconstruction circuitry 116, and up-conversion circuitry 118. The frame buffers 114 may include two or more memory buffers where each memory buffer is configured to store the data of a foveated image received from the GPU 102. The frame buffers 114 may implement a double buffer in which one memory buffer is receiving foveated image data from the GPU 102 while a different memory buffer is outputting foveated image data of a frame previously received from the GPU 102 for reconstruction. The frame buffers 114 may receive foveated image data from the GPU 102 at a constant rate or in bursts, e.g., if the GPU frame buffer 112 is bypassed, which may reduce image presentation latency.

Transfer of foveated image data from the GPU 102 to the display controller 104 allows for a number of optimizations with respect to the frame buffers 114 and associated circuitry. Because the amount of data transmitted for a foveated image is no more than ¼ that of the corresponding high-resolution data, the input bandwidth of the frame buffers 114 can be reduced by at least a factor of 4, and up to a factor of 100 or more for some images. Similarly, the size of the frame buffers 114 can be reduced by a factor of four relative to a conventional system, which reduces circuit area and cost. Additional, no image processing is needed on the input side (the "write side") of the frame buffers 114, which also reduces the power consumption and cost of the display controller 104.

Implementations of the gaze tracking display system 100 may further reduce the amount of image data transferred from the GPU 102 to the display controller 104 by providing pixel data in luminance-chrominance (YCrCb) format rather than red-green-blue (RGB) format, where the YCrCb format pixel data may be decimated, e.g., by a factor of 2 or 4. Given 30 bits per pixel in RGB format and 20 bits per pixel in YCrCb format, some implementations may reduce the size of the frame buffer 114 by a factor of 1.5 when using YCrCb format. Given the factor of 4 size reduction attributable to foveated image data, the additional size reduction due to YCrCb pixel format allows the frame buffers 114 be reduced in size by a factor of 6 relative to conventional systems.

The display controller 104 enables use of YCrCb pixel format by providing processing of image data after the frame buffers 114. Thus, in the display controller 104, foveated image data received in YCrCb pixel format can be converted to RGB format on the read side of the frame buffers 114. In conventional systems that employ a DMD in the display device 104 the data stored in frame buffers must be in RGB format.

Some implementations of the display controller 104 include conversion circuitry ahead of the frame buffers 114 that converts foveated image data received in RGB pixel format to YCrCb pixel format prior to storage of the data in frame buffers 114.

The foveated image data reconstruction circuitry 116 processes the foveated image data read from the frame buffers 114. Processing provided by the foveated image data reconstruction circuitry 116 includes conversion from YCrCb pixel format to RGB pixel format, and image reconstruction from the foveated image data. The foveated image data reconstruction circuitry 116 may include a look-up table to provide conversion from YCrCb pixel format to RGB pixel format. To perform image reconstruction, the foveated image data reconstruction circuitry 116 includes circuits to replicate pixel values provided with respect to one or more frames of foveated image data received from the GPU 102. For example, the foveated image data reconstruction circuitry 116 may include circuitry that provides spatial replication of pixel data within a given frame, and/or circuitry that provides temporal replication of pixel data across different frames. With the foveated image data, the GPU 102 provides information (a foveation header) that describes the provided frame data. In various implementations, the foveation header may be provided with each portion of a of frame of foveated image data, with each frame of foveated image data, with multiple frames of foveated image data, or with an image sequence. The display controller 104 receives and applies the foveation header to reconstruct the image.

In some implementations of the gaze tracking display system 100, pixel processing is performed on a block basis. For example, a block of 8 by 8 pixels is employed in some implementations. Some implementations may employ a different block size (e.g., 16 by 16). Eight by eight block size provides the GPU 102 with fine resolution during rendering regarding the use of different foveation compression factors on a region-by-region basis.

At the start of every frame the GPU 102 transmits a foveation header to the display controller. The foveation header provides information on each block (e.g., each 8×8 block) in the image. The foveation header may be sent in the vertical blanking time at the start of each frame. The typical amount of data in the foveation header may be roughly equivalent to two image lines. Thus, some implementations transmit the foveation header over a high-speed interface so that all data can be received within the vertical blanking time. Some implementations of the gaze tracking display system 100 transmit the foveation header over the same high-speed interface that is used to transmit image data from the GPU 102 to the display controller 104. In some implementations, an interface compliant with the Display Serial Interface (DSI) standard may be used to transfer foveated image data and foveation headers from the GPU 102 to the display interface 104.

Figures 3A, 3B:
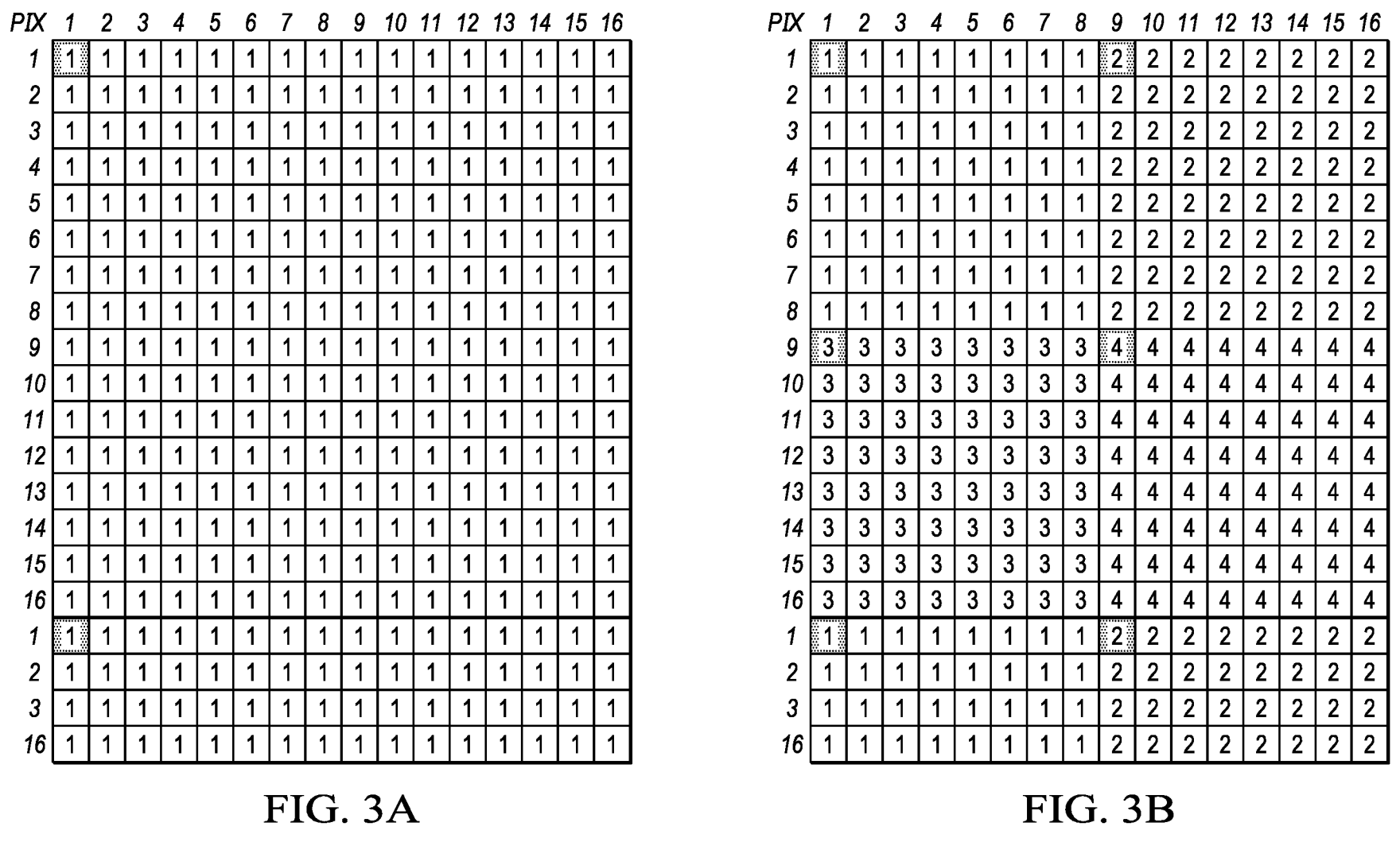
Figure 3C:
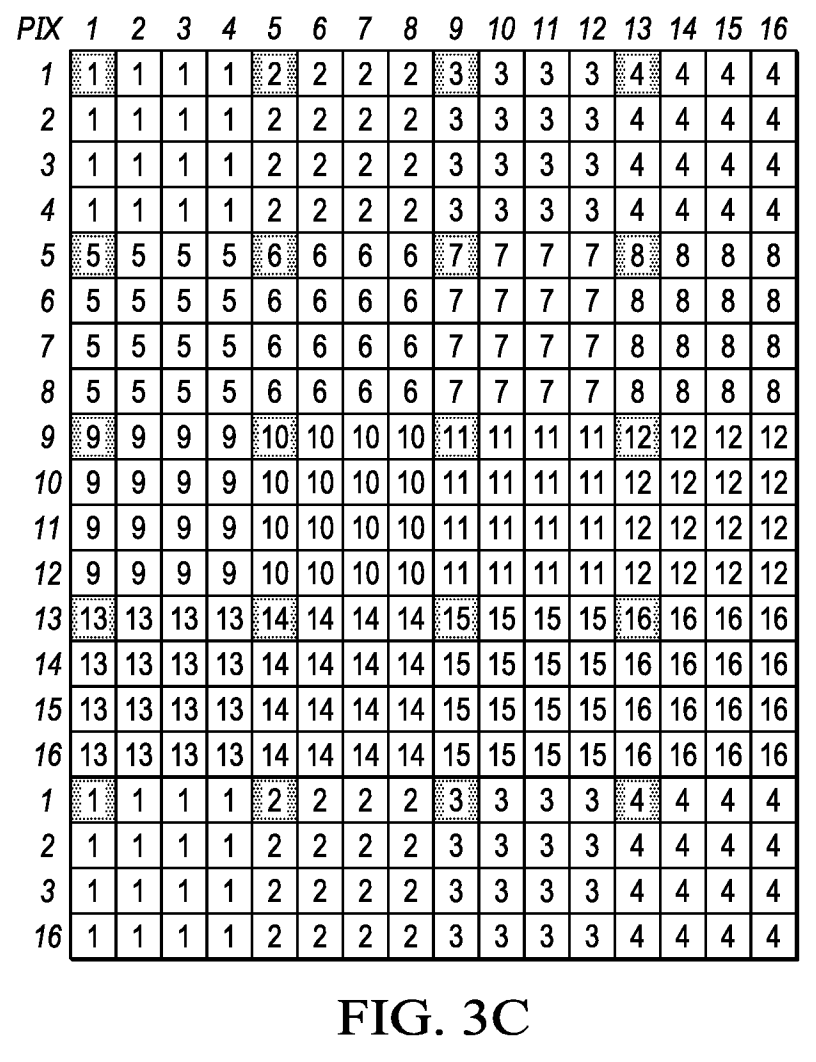

The foveated image data reconstruction circuitry 116 decompresses the foveated data for each block (e.g., each 8×8 block) on the read-side of the frame buffer 114. The decompression restores the image represented by the foveated data. To minimize bandwidth and power, foveated image data reconstruction circuitry 116 may use pixel replications to fill in missing pixels. FIGS. 3A-3C show spatial reconstruction of foveated image data in a display controller in accordance with various examples. FIG. 3A shows a 16×16 pixel block in which only a single pixel value, the shaded pixel, is provided in the foveated image data received from the GPU 102. The foveated image data reconstruction circuitry 116 replicates the provided pixel value to every pixel of the 16×16 block (every pixel of the 16×16 block that is below or to the right of the provided pixel value). The pattern of FIG. 3A represents reduction in image data by a factor of 256. FIG. 3B shows a 16×16 pixel block in which a pixel value, the shaded pixels, is provided in the foveated image data received from the GPU 102 for every 8×8 block of pixels. For every provided pixel value, the foveated image data reconstruction circuitry 116 replicates the provided pixel value to every pixel of the block that is below or to the right of the provided pixel value. The pattern of FIG. 3B represents reduction in image data by a factor of 64. FIG. 3C shows a 16×16 pixel block in which a pixel value, the shaded pixels, is provided in the foveated image data received from the GPU 102 for every 4×4 block of pixels. For every provided pixel value, the foveated image data reconstruction circuitry 116 replicates the provided pixel value to every pixel of the block that is below or to the right of the provided pixel value. The pattern of FIG. 3C represents reduction in image data by a factor of 16.

Some implementations of the foveated image data reconstruction circuitry 116 may provide spatial replication of pixel data in a different way than that shown in FIGS. 3A-3C. For example, some implementations may implement replication of a pixel such that a provided pixel value is surrounded as equally as possible by replicated pixels on all sides. Rather than simple replication, some implementations may apply interpolation between provided pixel values to fill in the missing pixels.

A foveation header for a block of image data may include fields specifying spatial replication, temporal replication, and/or pixel format for the block. The spatial replication field may specify the spatial decimation pattern applied in the block and whether the pattern is to be applied to an adjacent block. For example, a seven-bit field may include six bits specifying which of 64 different decimation patterns is applied in the block, and a one-bit field specifying the same decimation pattern was applied to an adjacent block. The temporal replication field may specify (e.g., via a single bit flag) whether the block is to be written to the frame buffers 114. E.g., if the block is not written, then data of a previously written frame may be applied in place of the discarded pixel data. The pixel format field may specify the format and/or size of pixel data, e.g., YCrCb or RGB and/or number of pixel bits. For example, a three-bit field may specify one of seven YCrCb or RGB pixel sizes as being applied to the block.

The up-conversion circuitry 118 receives the reconstructed image from the foveated image data reconstruction circuitry 116 and transmits the reconstructed image data to the display device 106 multiple times to increase the frame rate. The up-conversion circuitry 118 may include de-gamma circuitry, spatial temporal multiplexing (STM) circuitry, and bit-plane generation circuitry. The de-gamma circuitry adjusts the contrast or luminance of the image data received from the foveated image data reconstruction circuitry 116. The bit-plane generation circuitry produces bit-planes from the RGB pixel data (e.g., bit planes for each color) received from the foveated image data reconstruction circuitry 116. The STM circuitry applies dithering to the image data to be transmitted to the display device 106.

Each time an image is transmitted to the display device, the up-conversion circuitry 118 applies a different spatial temporal multiplexing (STM) dither pattern to the image data. This allows for lower dither noise since every full frame of data displayed has a unique set of spatial dither patterns used. Faster temporal movements of the spatial dither patterns reduce the perceptibility of dither noise. The up-conversion circuitry 118 may increase the frame rate of image data transmitted to the display device 106 to a rate of up to 1440 frames per second (or higher in some implementations). By increasing the frame rate, the up-conversion circuitry 118 may suppress or eliminate color separation artifacts.

In implementations of the gaze tracking display system 100 in which the display device 106 includes a DMD, as the display frame rate increases fewer bit-planes are required to be loaded per display frame time. This is because the temporal STM dither patterns are moved at a faster rate since each complete frame is shown at high rates. This faster movement of dither patterns helps improve the perceived signal-to-noise for dithering. For example, 24 RGB bit-planes may be needed at 60 Hz, but at 1440 Hz only 9 RGB bit-planes may be needed to give the same temporal dither noise performance as perceived by a user viewing images.

Figure 4:
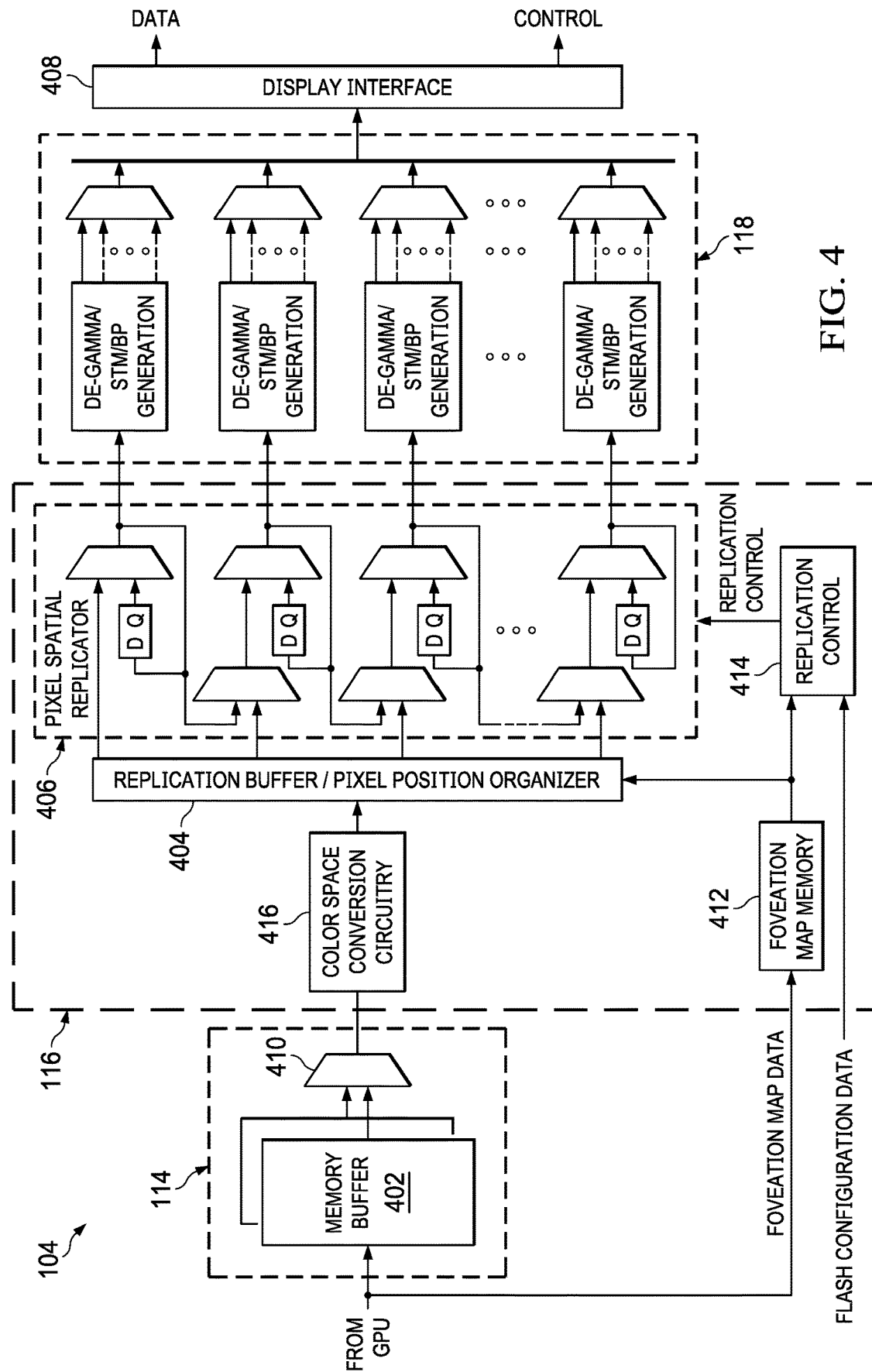
FIG. 4 shows a block diagram of a display controller that processes foveated image data in accordance with various examples.

FIG. 4 shows a block diagram of the display controller 104 in accordance with various examples. The display controller 104 includes frame buffers 114, foveated image data reconstruction circuitry 116, up-conversion circuitry 118, and display interface circuitry 408. The frame buffers 414 include a plurality of memory buffers 402. Each memory buffer 402 includes storage for a frame of foveated image data received from the GPU 102. A multiplexer 410 or equivalent data selection circuitry routes foveated image data associated with a first frame from one of the memory buffers 402 to the foveated image data reconstruction circuitry 116 while foveated image data received from GPU 102 for a second frame is written to a different one of the memory buffers 402.

The foveated image data reconstruction circuitry 116 includes color space conversion circuitry 416, foveation header memory 412, replication control circuitry 414, replication buffer/pixel position organizer 404, and pixel spatial replicator 406. The multiplexer 410 routes foveated image data read from a selected one of the memory buffers 402 to the color space conversion circuitry 416. The color space conversion circuitry 416 converts pixel data stored in the frame buffers 114 in YCrCb format to RGB format and provides RGB format pixel data to the replication buffer/pixel position organizer 404. The pixel format and size can vary across blocks because the GPU 102 can reduce the bit-depth for blocks a predetermined distance away from the user's point of focus (e.g., pixels of area 206 of image 200 may be represented using fewer bits than pixels in areas 204 and/or 202).

For each frame of foveated image data, the GPU 102 transmits a foveation header to the display controller 104. The foveation header is stored in foveation header memory 412. The foveation header memory 412 provides the foveation header to the replication control circuitry 414 and to the replication buffer/pixel position organizer 404 for use in image reconstruction. The foveation header specifies the parameters of spatial replication and temporal replication for each block of the foveated image data.

The replication buffer/pixel position organizer 404 receives the RGB format foveated image data provided from the frame buffers 114 via the color space conversion circuitry 416. If the display device 106 is loaded in column by column (e.g., the display device 106 includes a DMD), then the replication buffer/pixel position organizer 404 stores sufficient foveated image data to allow a column of pixel data to be built over a number of reads from the frame buffers 114. Pixel column data is scattered in the frame buffers 114. The replication buffer/pixel position organizer 404 sorts the data read from the frame buffers 114 into columns before spatial replication is performed. Alternatively, some implementations of the display controller 104 may include circuitry that sorts the pixel data into columns before the data is written into the frame buffers 114.

The pixel spatial replicator 406 receives the pixel column data built up by the replication buffer/pixel position organizer 404 and copies pixel values into pixels locations for which values are not provided in the foveated image data. The pixel spatial replicator 406 includes flip-flops that form a column buffer to store the pixel data of a display column, and multiplexers that enable routing of a pixel value to a given row of the column from an immediately higher row of the column and/or from the same row of the immediately prior column. In this way, pixel spatial replicator 406 replicates pixel values within and across columns.

The decompressed RGB column data produced by the pixel spatial replicator 406 is provided to the up-conversion circuitry 118. The up-conversion circuitry 118 includes de-gamma circuitry, STM circuitry, and bit-plane generation circuitry. The de-gamma circuitry applies a de-gamma function to each pixel to be displayed on the display device 106. The bit-plane generation circuitry produces bit-planes from the RGB pixel data (e.g., bit planes for each color) received from the pixel spatial replicator 406. The STM circuitry applies dithering to the pixels to be displayed to the display device 106. The up-conversion circuitry 118 include multiplexers that select a bit plane to be transmitted to the display device 106.

Some implementations of the display controller 104 may include circuitry that performs pixel replication prior to writing the image data into the frame buffers 114. In such implementations, a warping engine may be included to provide very high image quality during image reconstruction.

The display interface circuitry 408 includes driver circuitry to drive the image data to the display device, and control circuitry to control the timing of operations of the display device 106 and/or transmission of image data to the display device.

FIG. 5 shows a flow diagram for a method 500 for producing image data in a graphics processor in accordance with various examples. Though depicted sequentially as a matter of convenience, at least some of the actions shown can be performed in a different order and/or performed in parallel. Additionally, some implementations may perform only some of the actions shown. In some implementations, at least some of the operations of the method 500 can be implemented by the GPU 102.

In block 502, the gaze tracking camera 108 is capturing images of the eyes of a user of the gaze tracking display system 100. The images are processed by the GPU 102, or by another component of the gaze tracking display system 100, to produce gaze data that identifies a location of the display device 106 or of an image displayed on the display device 106 on which the user's eyes are focused. The GPU 102 receives the gaze data for use in foveated rendering of images to be displayed on the display device 106.

In block 504, the GPU 102 applies the gaze data to render a foveated image. The foveated image provides high resolution in a relatively small area about the location on which the user's gaze is focused and lower resolution with distance from the location on which the user's gaze is focused. The GPU 102 generates a foveation header for each pixel block of the foveated image. The foveation header specifies spatial replication parameters, temporal replication parameters, and/or pixel format parameters for the pixel block. The pixels of the foveated image may be represented in RGB format or in YCrCb format. Some implementations employ YCrCb format to further reduce the amount of image data to be transferred to the display controller 104.

In block 506, the GPU 102 transmits the foveated image data and the foveation header to the display controller 104. The GPU 102 may transmit the foveated image data and the foveation header to the display controller 104 via a DSI compliant interface. The GPU does not reconstruct an image from the foveated image data.

FIG. 6 shows a flow diagram for a method 600 for processing image data in a display controller in accordance with various examples. Though depicted sequentially as a matter of convenience, at least some of the actions shown can be performed in a different order and/or performed in parallel. Additionally, some implementations may perform only some of the actions shown. In some implementations, at least some of the operations of the method 600 can be implemented by the display controller 104. The method 500 may be performed in conjunction with the method 600 in the gaze tracking display system 100.

In block 602, the display controller 104 receives the foveated image data and the foveation header generated by the GPU 102. The display controller 104 may receive the foveated image data and the foveation header generated by the GPU 102 via a DSI compliant interface.

In block 604, display controller 104 stores the foveated image data in the frame buffer 114, and stores the foveation header in the foveation header memory 412.

In block 606, the display controller 104 reads the foveated image data from the frame buffer 114 and reads the foveation header corresponding to the foveated image data from the foveation header memory 412. The foveated image data and the foveation header are provided to the foveated image data reconstruction circuitry 116.

In block 608, the foveated image data reconstruction circuitry 116 applies the foveation header to convert pixels of the foveated image data from YCrCb format to RGB format. The foveation header specifies the format of the pixel data.

In block 610, the foveated image data reconstruction circuitry 116 applies the foveation header to reconstruct an image from the foveated image data. Image reconstruction includes spatial replication of pixel data in the pixel blocks of the foveated image data. The foveation header specifies the pixel block decimation pattern, which in turn determines how pixel replication is to be performed (e.g., determines which pixels are to be filled in by replication).

In block 612, a de-gamma function is applied to each pixel output by the data reconstruction circuitry 116. The de-gamma function adjusts the contrast or luminance of the image data.

In block 614, STM dithering is applied to the pixel data. The dithering applies a mask to the pixel information that selects a subset of pixels for display.

In block 616, the pixel data is converted to bit-planes, and a bit plane is selected for display.

In block 618, the data of the selected bit-plane is driven to the display device 106 for presentation, and the display device 106 generates a visual display based on the data received.

The operations of blocks 614-618 may be performed at a rate that produces a high rate of image transfer (a high frame rate) to the display device. For example, the operations of blocks 614-618 may be performed multiple times for each foveated image transferred from the GPU 102 to the display controller 104. In some implementations, operations of blocks 614-618 may be performed at a rate suitable to suppress color separation artifacts (e.g., a rate of 1440 frames per second).

The above discussion is meant to be illustrative of the principles and various examples of the present invention. Numerous variations and modifications will become apparent to those skilled in the art once the above disclosure is fully appreciated. It is intended that the following claims be interpreted to embrace all such variations and modifications.

What is claimed is:

1. A gaze tracking display system, comprising:
   a graphics processor configured to:
      perform foveated rendering of image data; and
      output foveated image data;
   display circuitry coupled to the graphics processor, the display circuitry including:
      a display device configured to produce a viewable image; and
      a display controller configured to drive the display device, the display controller including foveated data reconstruction circuitry and a frame buffer coupled to the foveated data reconstruction circuitry;
   the foveated data reconstruction circuitry configured to produce an image at a resolution of the display device based on the foveated image data from the graphics processor; and
   the frame buffer configured to store the foveated image data from the graphics processor, provide the stored foveated image data to the foveated data reconstruction circuitry, and store no more than one-quarter of the pixel data of the image at the resolution of the display device.

2. A gaze tracking display system, comprising:
   a graphics processor configured to:
      perform foveated rendering of image data; and
      output foveated image data;
   display circuitry coupled to the graphics processor, the display circuitry including:
      a display device configured to produce a viewable image; and a display controller configured to drive the display device, the display controller including foveated data reconstruction circuitry and a frame buffer coupled to the foveated data reconstruction circuitry;

the foveated data reconstruction circuitry configured to produce an image at a resolution of the display device based on the foveated image data from the graphics processor;

the frame buffer configured to store the foveated image data from the graphics processor, provide the stored foveated image data to the foveated data reconstruction circuitry, and store no more than one-sixth of the pixel data of the image at the resolution of the display device.

3. A gaze tracking display system, comprising:
a graphics processor configured to:
  perform foveated rendering of image data; and
  output foveated image data;
display circuitry coupled to the graphics processor, the display circuitry including:
  a display device configured to produce a viewable image; and
  a display controller configured to drive the display device, the display controller including foveated data reconstruction circuitry and a frame buffer coupled to the foveated data reconstruction circuitry;
the foveated data reconstruction circuitry configured to produce an image at a resolution of the display device based on the foveated image data from the graphics processor;
the frame buffer configured to store the foveated image data from the graphics processor and provide the stored foveated image data to the foveated data reconstruction circuitry; and
the display controller configured to convert the foveated image data stored in the frame buffer as values of luminance and chrominance to red-green-blue encoded data before transferring the foveated image data to the foveated data reconstruction circuitry.

4. A gaze tracking display system, comprising:
a graphics processor configured to:
  perform foveated rendering of image data; and
  output foveated image data;
display circuitry coupled to the graphics processor, the display circuitry including:
  a display device configured to produce a viewable image; and
  a display controller configured to drive the display device, the display controller including foveated data reconstruction circuitry and a frame buffer coupled to the foveated data reconstruction circuitry;
the foveated data reconstruction circuitry configured to produce an image at a resolution of the display device based on the foveated image data from the graphics processor;
the frame buffer configured to store the foveated image data from the graphics processor and provide the stored foveated image data to the foveated data reconstruction circuitry;
the graphics processor configured to:
  generate a foveation header for the foveated image data, the foveation header including spatial replication information for each block of the foveated image data; and
  provide the foveation header to the display controller in conjunction with the foveated image data; and
the display controller configured to apply the spatial replication information to reconstruct the image at the resolution of the display device from the foveated image data.

5. The gaze tracking display system of claim 4, wherein the foveation header includes temporal replication information for each block of the foveated image data, and the display controller is configured to apply the temporal replication information to control writing of the foveated image data to the frame buffer.

6. The gaze tracking display system of claim 1, wherein the display device is configured to display only red-green-blue encoded image data, and the graphics processor is configured to provide the foveated image data encoded as values of luminance and chrominance.

7. The gaze tracking display system of claim 1, wherein the display controller is configured to provide the image at the resolution of the display device to the display device at a rate of up to 1440 frames per second.

8. A gaze tracking display system, comprising:
a graphics processor configured to:
  perform foveated rendering of image data; and
  output foveated image data;
display circuitry coupled to the graphics processor, the display circuitry including:
  a display device configured to produce a viewable image; and
  a display controller configured to drive the display device, the display controller including foveated data reconstruction circuitry and a frame buffer coupled to the foveated data reconstruction circuitry;
the foveated data reconstruction circuitry configured to produce an image at a resolution of the display device based on the foveated image data from the graphics processor;
the frame buffer configured to store the foveated image data from the graphics processor and provide the stored foveated image data to the foveated data reconstruction circuitry; and
the foveated data reconstruction circuitry configured to:
  receive the foveated image data from the graphics processor;
  perform pixel replication to produce the image at the resolution of the display device; and
  store the image at the resolution of the display device in the frame buffer.

9. A method for generating an image display, the method comprising:
performing, by a graphics processor, foveated rendering of image data to produce foveated image data;
transferring the foveated image data from the graphics processor to a display controller that drives a display device;
generating, by the display controller, an output image at a resolution of the display device from the foveated image data from the graphics processor;
displaying, by the display device, the output image;
storing the foveated image data in a frame buffer at an input of the display controller, and providing the foveated data from the frame buffer to be processed as input to the generating; and
converting the foveated image data stored in the frame buffer as values of luminance and chrominance to red-green-blue encoded data before the generating.

10. A method for generating an image display, the method comprising:

performing, by a graphics processor, foveated rendering of image data to produce foveated image data;

transferring the foveated image data from the graphics processor to a display controller that drives a display device;

generating, by the display controller, an output image at a resolution of the display device from the foveated image data from the graphics processor;

displaying, by the display device, the output image;

storing the foveated image data in a frame buffer at an input of the display controller, and providing the foveated data from the frame buffer to be processed as input to the generating;

generating, by the graphics processor, a foveation header for the foveated image data, the foveation header including spatial replication information for each pixel of the foveated image data;

providing, by the graphics processor, the foveation header to the display controller in conjunction with the foveated image data; and applying, by the display controller, the spatial replication information to reconstruct the output image at the resolution of the display device from the foveated image data.

11. The method of claim 10, wherein the foveation header includes temporal replication information for each pixel of the foveated image data, and the method further comprises:
applying, by the display controller, the temporal replication information to control writing of the foveated image data to the frame buffer.

12. The method of claim 9, wherein the displaying includes driving the display device with red-green-blue encoded image data, and the foveated image data is encoded as values of luminance and chrominance.

13. The method of claim 9, further comprising providing the output image data to the display device at a rate of up to 1440 frames per second.

14. A display system, comprising:
a display device configured to produce a viewable image; and
a display controller configured to drive the display device, the display controller including:
a frame buffer configured to store foveated image data from a graphics processor; and
foveated data reconstruction circuitry coupled to an output of the frame buffer, the foveated data reconstruction circuitry configured to produce an image at a resolution of the display device based on the foveated image data stored in the frame buffer;
the display controller configured to convert the foveated image data stored in the frame buffer as values of luminance and chrominance to red-green-blue encoded data before transferring the foveated image data to the foveated data reconstruction circuitry.

15. A display system, comprising:
a display device configured to produce a viewable image; and
a display controller configured to drive the display device, the display controller including:
a frame buffer configured to store foveated image data from a graphics processor; and
foveated data reconstruction circuitry coupled to an output of the frame buffer, the foveated data reconstruction circuitry configured to produce an image at a resolution of the display device based on the foveated image data stored in the frame buffer;
the display controller configured to:
receive a foveation header in conjunction with the foveated image data, the foveation header including:
spatial replication information for each block of the foveated image data; and
temporal replication information for each block of the foveated image data; and
apply the spatial replication information to reconstruct the image at the resolution of the display device from the foveated image data; and
apply the temporal replication information to control writing of the foveated image data to the frame buffer.

* * * * *